United States Patent
Muthiah et al.

(10) Patent No.: US 9,489,423 B1
(45) Date of Patent: Nov. 8, 2016

(54) QUERY DATA ACQUISITION AND ANALYSIS

(71) Applicant: AMAZON TECHNOLOGIES, INC., Reno, NV (US)

(72) Inventors: Ramanathan Muthiah, Issaquah, WA (US); Aman Preet Singh, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 339 days.

(21) Appl. No.: 13/973,324

(22) Filed: Aug. 22, 2013

(51) Int. Cl.
*G06F 17/30* (2006.01)
*G06F 7/00* (2006.01)

(52) U.S. Cl.
CPC ... *G06F 17/30463* (2013.01); *G06F 17/30424* (2013.01); *G06F 17/30477* (2013.01); *G06F 17/30554* (2013.01); *G06F 17/30864* (2013.01)

(58) Field of Classification Search
None
See application file for complete search history.

(56) References Cited

U.S. PATENT DOCUMENTS

| | | | | |
|---|---|---|---|---|
| 7,908,242 B1* | 3/2011 | Achanta | | G06F 17/30442 707/602 |
| 7,953,698 B2* | 5/2011 | Beck | | G06F 17/30575 707/610 |
| 8,612,468 B2* | 12/2013 | Schloming | | G06F 17/30595 707/763 |
| 8,880,506 B2* | 11/2014 | Chang | | G06F 17/30935 707/715 |
| 9,009,135 B2* | 4/2015 | Gutlapalli | | G06F 17/30 707/711 |
| 9,037,609 B1* | 5/2015 | Tibbitts | | G06F 17/30 707/783 |
| 9,081,805 B1* | 7/2015 | Stamen | | G06F 17/30297 |
| 2004/0181537 A1* | 9/2004 | Chawla | | G06F 17/30917 |
| 2006/0248046 A1* | 11/2006 | Galindo-Legaria | | G06F 17/30474 |
| 2013/0173539 A1* | 7/2013 | Gilder | | G06F 17/30578 707/622 |
| 2013/0254171 A1* | 9/2013 | Grondin | | G06F 17/30566 707/693 |
| 2014/0143263 A1* | 5/2014 | Ritter | | G06F 17/30303 707/756 |
| 2014/0280368 A1* | 9/2014 | Kemmler | | G06F 17/30294 707/803 |
| 2014/0337373 A1* | 11/2014 | Morsi | | G06F 17/30424 707/769 |
| 2015/0032684 A1* | 1/2015 | Gupta | | G06F 17/30575 707/600 |

* cited by examiner

*Primary Examiner* — Dung K Chau
(74) *Attorney, Agent, or Firm* — Lindauer Law, PLLC

(57) ABSTRACT

Described in this disclosure are systems and techniques for acquiring query data which includes an execution plan descriptive of how queries used to access a database are processed. In one implementation, an inquiry analysis system uses a copy of a production system to generate execution plan information. The copy includes tables, relationships, metadata, and so forth, but may omit data in the tables, allowing for a compact installation. By analyzing the query data, usage trends, inefficient queries, unused fields, and so forth may be determined and used for maintenance or performance improvements.

20 Claims, 9 Drawing Sheets

```
                    EXECUTION PLAN
                         128

SELECT STATEMENT
NESTED LOOPS
TABLE ACCESS BY INDEX ROWID SO_HEADERS_ALL
INDEX RANGE SCAN SO_HEADERS_N1
TABLE ACCESS BY INDEX ROWID SO_LINES_ALL
INDEX RANGE SCAN SO_LINES_N1
...
```

QUERY DATA ACQUISITION AND ANALYSIS

BACKGROUND

Databases store information associated with various endeavors such as e-commerce, communication, medicine, education, government, and so forth. Database size continues to grow at a tremendous rate, with databases now routinely exceeding several terabytes. The number of inquiries made to those databases has also grown.

Figure 1:
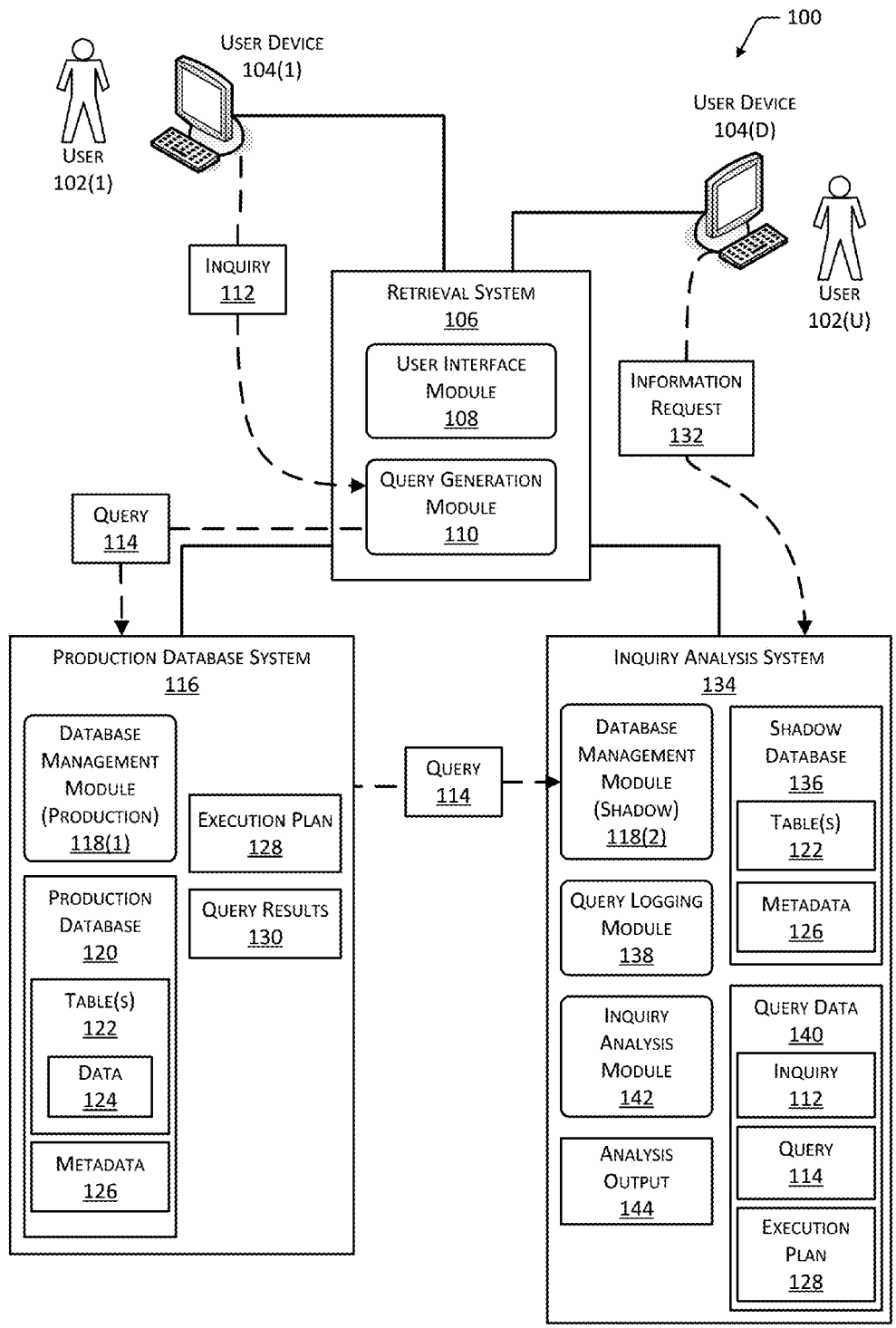
FIG. 1 is an illustrative system for generating and analyzing query data which comprises a query and an execution plan associated with the query.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

Online merchants, service providers, and other organizations use ever increasing amounts of data to provide various services. This data may be stored in databases. Databases and the tools used to manipulate the data in those databases continue to grow in size and complexity. Databases having billions of records and terabytes of data are becoming more and more commonplace. The organizations using these databases are using ever more sophisticated interactions with these databases. For example, an online merchant may have hundreds or thousands of different business units which engage in different interactions with a given database on a daily basis.

Databases may be broadly segregated into two categories relational and non-relational. Relational databases store information in data structures often conceptualized as tables. In a relational database, a particular position at a row and column conveys information about the piece of information. For example, each row in a table may be associated with a single customer while a column may store a telephone number. In comparison, non-relational databases may use key-value pairing to store data.

Users may interact with databases manually or using tools which produce output in one or more programming languages designed for use with the databases. For example, information in a relational database may be manipulated using one or more expressions phrased in structured query language ("SQL") statement. A database management module parses the query, such as a SQL statement, and performs one or more actions against the data in the database. A user may formulate a query manually or by using a retrieval system. For example, the user may create a SQL statement by hand, or may use an interface to generate the SQL statement from an inquiry.

Traditional database systems may not provide details about processed queries. Information that may be captured may be short lived or contain little or no detail. As a result, users may lack the data to gain insight into the operation of those traditional systems. This may result in inefficient administration, operation, and maintenance of the databases.

Described in this application are systems and techniques for collecting and analyzing query data. The query data may include one or more of: the inquiry made, the query resulting from the inquiry, an execution plan associated with the query, or other information. The execution plan comprises detailed information about processing the query. For example, the execution plan may include data about operations performed, indices used, costs, and so forth. This disclosure describes the databases as relational for ease of illustration, and not necessarily as a limitation.

An inquiry analysis system is configured to maintain a shadow database. The shadow database duplicates the data structures and metadata associated with a production database, but may not include data. For example, copies are made of the table structures of a relational database, information about usage statistics, table relationships, but data is omitted from the tables. Queries which have been successfully executed by the production database are provided to the inquiry analysis system. The inquiry analysis system processes the query by executing the query against the shadow database to generate the execution plan. A query logging module is configured to generate and collect the query data from this execution. Once collected, an inquiry analysis module may be used to process information requests against the query data. Because the shadow database is representative of the production database, the execution plan generated by the shadow database may be considered representative of the execution plan of the same query on the production system. The inquiry analysis system may maintain the shadow database separately from the production database. For example, the inquiry analysis system may be executed on a separate server. This configuration decouples the operation of the production database from that of the shadow database. As a result, the operation of the query logging module may not impact operation of the production database. Furthermore, the inquiry analysis system may defer execution of queries for a later time, compared to the production system in which timeliness in executing the queries may be important.

Once collected, a user or automated process may analyze the query data. For example, the user may analyze the query data for time periods accessed in order to determine what data to move to archival storage or delete. Continuing the example, should the query data indicate that queries are made against order data which is less than two weeks old, order data which is more than two weeks old may be transferred to another table, database, storage device(s), and so forth. In another example, the query data may be analyzed to determine which columns are no longer being used so they may be deprecated.

The system and techniques are thus able to generate the query data which is representative of the production system without impacting the production system. Analysis of the query data may assist in the maintenance, administration, and operation of the databases. This may improve the overall experience of users interacting with the database, as well as of end users accessing services which rely on those databases.

Illustrative System

FIG. 1 is an illustrative system 100 for generating and analyzing query data which comprises a query and an execution plan associated with the query. Users 102(1), 102(2), 102(U) may use the system 100. The users 102 may access the system 100 using one or more user devices 104(1), 104(2), . . . , 104(D). The user device 104 may include tablet computers, personal computers, smartphones, wearable computing devices, and so forth.

The user 102 may use a user device 104 to access a retrieval system 106. The retrieval system 106 may comprise a server or other computing device configured to provide a user interface with which the user 102 may interact to initiate one or more operations with regard to a database. The retrieval system 106 may include a user interface module 108 configured to provide the user interface. In one implementation the user interface may comprise a web page configured to present information to and receive user input from the user device 104. In another implementation the user interface module 108 may provide an application program interface ("API") allowing applications executing on the user device 104 or other computing devices to access and initiate the one or more operations. A query generation module 110 is configured to accept input received using the user interface module 108 and process that input. In one implementation, the user 102 may use the user device 104 to send an inquiry 112 to the retrieval system 106. The user interface module 108 may receive the inquiry 112. The user interface module 108 passes the inquiry 112 to the query generation module 110 which is configured to generate a query 114. In some implementations the query generation module 110 may generate multiple queries 114 from the single inquiry 112. Likewise, in some implementation a single query 114 may result from multiple inquiries 112. For ease of illustration and not by way of limitation, the following discussion refers to a single inquiry 112 and a single query 114.

The retrieval system 106 may be configured to accept the inquiry 112. The inquiry 112 may be in one of many different formats, configurations, languages, and so forth. For example, the inquiry 112 may comprise a selection from a predefined set of queries 114 or reports, may accept natural language input, and so forth. The query generation module 110 uses the information in the inquiry 112 to produce one or more queries 114. The one or more queries 114 are configured for use with a production database system 116. For example, the query 114 may be a structured query language ("SQL") statement compatible with the production database system 116.

The production database system 116 receives the query 114. A database management module 118(1) for the production database system 116 is coupled to one or more production databases 120. The production database 120 comprises one or more data structures configured to store information. The production database 120 may comprise a relational database in which the data structures include tables 122 which are related to one another. Stored in the one or more tables are data 124. For example, the table 122 may be configured to store attributes about particular orders, while the data 124 is information about the order. The production database 120 may comprise a non-relational database, such as a key-value store. In some implementations the production database 120 may include relational and non-relational data structures.

The production database 120 may also include metadata 126. The metadata 126 provides information about the data structures, the data 124, operation of the database management module 118, statistics associated with operation of the database, and so forth. For example, the metadata 126 may comprise information about database schema such as relationships between two or more tables 122, indices, cost data associated with execution of the query 114 by the database management module 118, metrics associated with access to the production database 120 by the database management module 118, and so forth. The metadata 126 may be stored in one or more data structures. For example, the metadata 126 for the relational database may be stored in a table.

The database management module 118 processes the query 114 to perform one or more operations on the tables 122 or other data structures, the data 124 therein, the metadata 126, and so forth. The processing may include generating an execution plan 128. The execution plan 128 provides information indicative of execution of the query 114 against the production database 120. For example, the execution plan 128 may provide information such as primary keys used, tables accessed, join methods used, filter operations, sort operations, aggregation operations, and so forth. The execution plan 128 may also provide information such as the cost and cardinality of operations, what sets of partitions have been accessed, where parallel execution is used, and so forth.

The execution plan 128 provides insight into how the database management module 118 is interpreting and executing the query 114. The operation of the database management module 118, and thus the execution plan 128 may be dependent on various factors such as the data structures present in the production database 120, the metadata 126, and so forth. As used in this disclosure, unless otherwise indicated, "cost" indicates one or more metrics descriptive of resources used such as processor, memory, network bandwidth, and so forth. For example, the metadata 126 may indicate that a particular table 122(1) is more "costly" to access. Based on the metadata 126 indicating this costliness, the database management module 118 may parse the query 114 to minimize interactions with that table 122(1).

In some implementations, the production database system 116 may not generate the execution plan 128 in a form which is usable outside of the database management module 118. For example, to improve performance, the production database system 116 may be configured to omit generation and storage of execution plans 128 during processing of the queries 114. This may become particularly acute in high-volume situations. For example, where the database management module 118 is processing hundreds of thousands of different queries 114 each day it may be infeasible to generate and store the execution plans 128 at the production database system 116.

The database management module 118 may generate query results 130, based on the processing of the query 114. The query results 130 may include acknowledgement that an update to data 124 has been completed, a portion of the data 124 which has been retrieved, and so forth. The query results 130 may be returned to the retrieval system 106 for additional processing or for delivery to the user device 104.

Users may generate information requests 132 instead of, or in addition to, generating the inquiry 112. The information request 132 is configured to elicit information about how the query 114 is processed. For example, the information request 132 may be configured to determine date ranges which are included in one or more of the queries 114. Or the information request 132 may see information about filters which are used in the queries 114. By making the information requests 132 and using the results, users 102 such as system administrators, business managers, and so forth may gain insight into how the production database system 116 is being used. These insights may allow for improved management, such as easier deprecation of unused columns, improving table 122 structures to facilitate common join operations, and so forth.

The user 102 may use a user device 104 to generate or transfer the information request 132. For example, the user interface module 108 may be configured to allow the user 102 to formulate the information request 132. An inquiry analysis system 134 receives the information request 132. For example, the user device 104 or the retrieval system 106 may send the information request 132 to the inquiry analysis system 134.

The inquiry analysis system 134 is configured to process one or more queries 114 and respond to the information request 132. The inquiry analysis system 134 includes a database management module 118(2). The inquiry analysis system 134 may receive the one or more queries 114 from the production database system 116, the retrieval system 106, or another source.

The database management module 118(2) may be similar or identical to the database management module 118(1) of the production database system 116. The database management module 118(2) supports operations with a shadow database 136. For example, the query 114 may be executed by the database management module 118(2) to query the shadow database 136.

The shadow database 136 is configured to provide a representation of the production database 120, but may omit the data 124. For example, the shadow database 136 may duplicate the tables 122 and metadata 126 of the production database 120. In one implementation the shadow database 136 may include a subset of the data 124. For example, a sampling of data 124 may be included in the shadow database 136. By omitting the data 124, or using a reduced set of the data 124, the shadow database 136 uses fewer resources to process the queries 114. For example, with the shadow database 136 which omits the data 124 may be only a few hundred megabytes compared to the many terabytes of the production database 120. As a result, the inquiry analysis system 134 is able to process the queries 114 and information requests 132 quickly and with potentially less costly hardware.

Fidelity of the shadow database 136 may be maintained by updating the shadow database 136 based on changes to the production database 120. For example, operations which use a data definition language which affect table 122 structures in the production database 120 may be sent to the shadow database 136 to duplicate those changes. In some implementations, periodic updates may be used. For example, the metadata 126 in the production database 120 may be copied to the shadow database 136 on a weekly basis.

The inquiry analysis system 134 may include a query logging module 138. The query logging module 138 is configured to maintain query data 140. The query data 140 may include one or more of the inquiry 112, the query 114, the execution plan 128, information about who made the information request 132, and so forth. The query logging module 138 may be configured to initiate generation of the execution plan 128, access information such as the execution plan 128, and so forth. For example, the production database system 116 and the inquiry analysis system 134 may use the Oracle® database system by Oracle Corporation of Redwood City, Calif. In this example, the query logging module 138 may use the "EXPLAIN PLAN" statement to generate and store the execution plan 128 for the query 114 which is being processed.

The query data 140 provides information about execution and operation of the query 114 against the shadow database 136. As described above, the shadow database 136 is representative of the production database 120. For example, the shadow database 136 may duplicate the tables 122, the metadata 126, and so forth while omitting the data 124. The database management module 118 operates as a deterministic system, in that particular input produces the same output. Thus, the same query 114 executed by the database management module 118(2) on the shadow database 136 will produce the same or a substantially similar execution plan 128 as that generated by the database management module 118(1) using the production database 120. As a result, the production database system 116 remains free to respond to the queries 114, while the inquiry analysis system 134 builds and maintains the query data 140 with details about those queries 114.

The query logging module 138 may perform other functions as well. In one implementation, different versions of the shadow database 136 may be maintained for analytical purposes. For example, a system administrator may test proposed changes to the tables 122, the metadata 126, and so forth. The query logging module 138 may also be configured to maintain information about changes over time to the shadow database 136. For example, metadata 126 indicative of costs associated with processing a particular query 114 may be stored and maintained for analysis.

Processing of the queries 114 may be done as queries 114 are received, based on processing of the information request 132, on a periodic basis, or a combination thereof. For example, the inquiry analysis system 134 may be configured to process all queries 114 upon receipt. In some implementations, a query 114 may fail or generate an error due to a difference between the production database 120 and the shadow database 136. In these implementations, the query 114 may be stored and executed to generate query data 140 at a later time.

The query logging module 138 may be configured to execute queries 114 which have been previously run to generate new query data 140. For example, the shadow database 136 may differ from the production database 120. As a result, metadata 126 modified in the production database 120 may not yet have been copied to the shadow database 136. The queries 114 may be re-processed, and updates made to the query data 140.

An inquiry analysis module 142 is configured to process the information request 132 and generate analysis output 144 based on the query data 140. For example, based on the information request 132 for date ranges in the queries 114, the analysis output 144 may include information indicating that the queries 114 are for date ranges in the last seven days in the current year and for the year previous. The administrator may modify operation of the production database system 116 using this analysis output 144. For example, the administrator may maintain a table 122 which stores information for the last seven days of the current year and the year previous, and execute subsequent queries 114 against this table 122. As a result, resources used by the database management module 118(1) to process such queries 114 may be reduced, time to provide the query results 130 may be reduced, and so forth.

The inquiry analysis module 142 may be configured to generate notifications based on the analysis output 144 meeting one or more conditions or criteria. For example, a notification may be generated when the data range of a query 114 is beyond the last seven days of the current year and the year previous. These notifications may be provided to users 102 such as system administrators.

The user devices 104, the retrieval system 106, the production database system 116, the inquiry analysis system 134, and so forth may be coupled to one another using one or more networks. These networks may include a cabled local area network ("LAN"), wireless local area network ("WLAN"), wide area network ("WAN"), wireless wide area network ("WWAN"), personal area networks ("PAN"), and so forth. For example, the network may couple to the Internet or other data service enabling the transmission of information such that the user device 104 is at one location while the retrieval system 106 is at another.

FIG. 1 depicts the retrieval system 106, the production database system 116, and the inquiry analysis system 134 as separate systems. In some implementations one or more functions of these systems may be integrated, shared, distributed, and so forth. For example, a single database system may support both the production database 120 and the shadow database 136. In some implementations the retrieval system 106 may be omitted. For example, user's 102 or processes may directly submit SQL queries to the production database system 116.

The inquiry analysis system 134 provide query data 140 and analysis output 144 which is useful in the administration, operation, and maintenance of the production database system 116. This information is provided without burdening the production database system 116 which is performing tasks associated with the operation of the organization.

Figure 2:
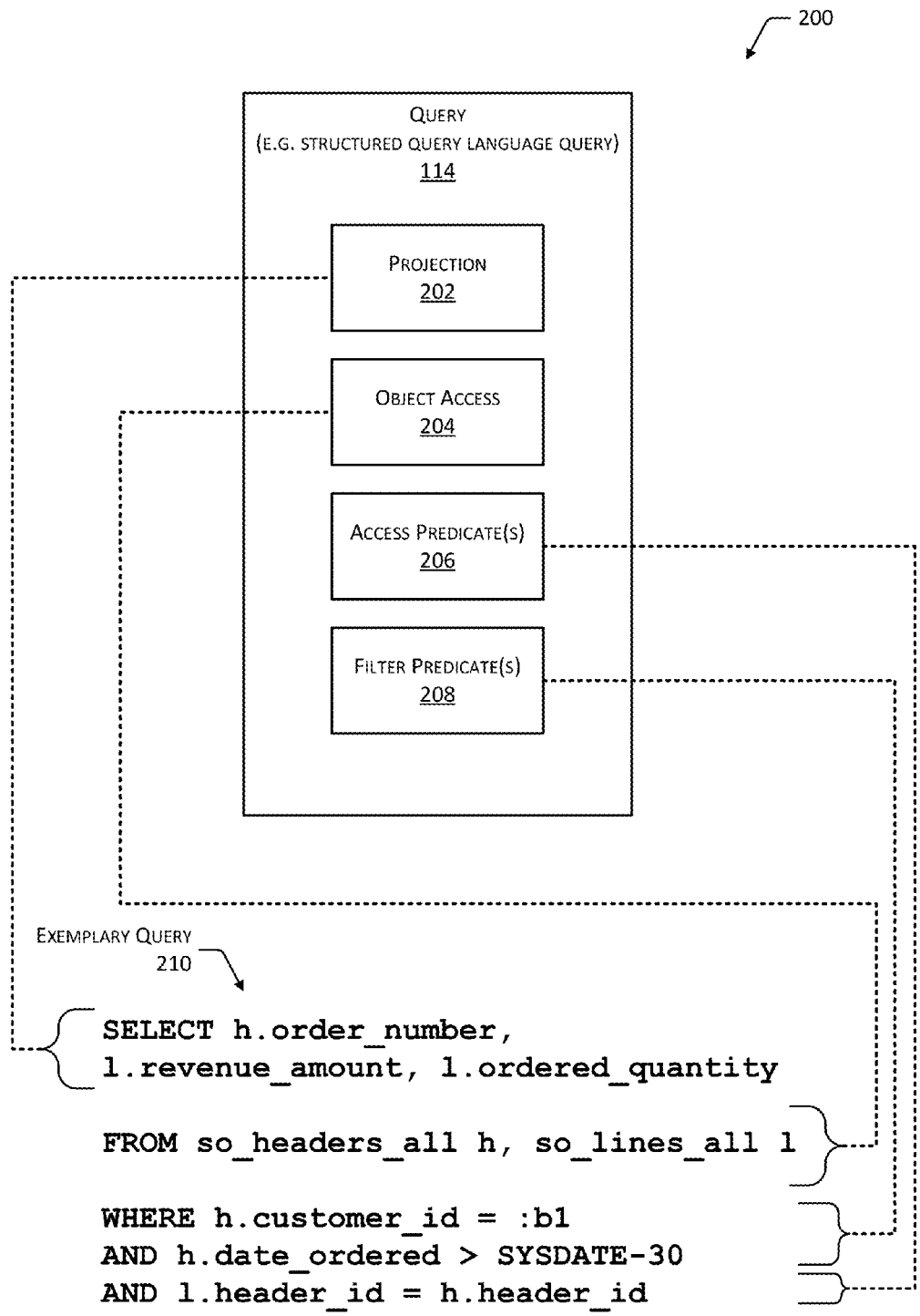
FIG. 2 is a block diagram of the query in structured query language.

FIG. 2 is a block diagram 200 of the query 114 as expressed using a structured query language ("SQL"). A variety of techniques and languages are available for interacting with a database system. An expression or statement using a data manipulation language, data definition language, and so forth may be used to express the inquiry 112 of the user 102 as the query 114. One language is SQL. SQL statements may be used to manage or otherwise interact with relational databases, non-relational databases, or both. In some implementations, SQL used by the system 100 may be at least partly compliant with the SQL standard as originally promulgated by the American National Standards Institute ("ANSI") and the International Organization for Standards ("ISO"), such as ISO/IEC 9076. The examples in this disclosure are made for illustrative purposes, and not by way of limitation, using the commands and syntax associated with operation of the Oracle® database products promulgated by Oracle Corporation.

The query 114 may be considered to have four main sections: a projection 202, an object access 204, an access predicate 206, and a filter predicate 208. Each of these sections may in turn have additional details or expressions. The projection 202 defines a group of one or more columns from one of the tables 122. The object access 204 specifies information about the tables 122 or views used in the query 114 and may designate shortened names. The access predicate 206 links two or more tables 122 together. For example, the access predicate 206 may include join conditions used for associating data 124 in two different tables 122. The filter predicate 208 returns a subset of data based on specified criteria.

An exemplary query 210 is depicted in this illustration. The projection 202 comprises the "SELECT" portion, the object access 204 comprises the "FROM" portion, and the access predicates 206 and the filter predicates comprise the "WHERE" portion. The database management module 118 parses out the projection 202, the object access 204, the access predicates 206, and the filter predicates 208, and executes the appropriate actions against the database.

The inquiry analysis system 134 may be used to analyze one or more of these sections of the query 114. For example, the information request 132 may ask for information about what tables 122 are being accessed. The analysis output 144 based on the query data 140 for the exemplary query 210 may return the names of the tables 122 "so_headers_all" and "so_lines_all".

Figure 3:
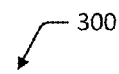
FIG. 3 illustrates an execution plan based on processing the query.

FIG. 3 illustrates the execution plan 128 based on processing the SQL query 114 described above in FIG. 2. As described above, the execution plan 128 provides information indicative of execution of the query 114 against the database such as the production database 120 or the shadow database 136.

In this illustration the execution plan 128 provides information about the order of operations and what operations were provided by the database management module 118. For example, the presence of several nested loops is shown here. The execution plan 128 may include extensive information indicative of the operation of the query 114. The information provided may be determined by the capabilities of the database management module 118 to generate this information.

The information, format, and so forth of the execution plan 128 may vary based on operation of the database management module 118, configuration settings, and so forth. For example, the execution plan 128 may include the SQL expression illustrated in the exemplary query 210 as well as the information depicted here.

Figure 4:
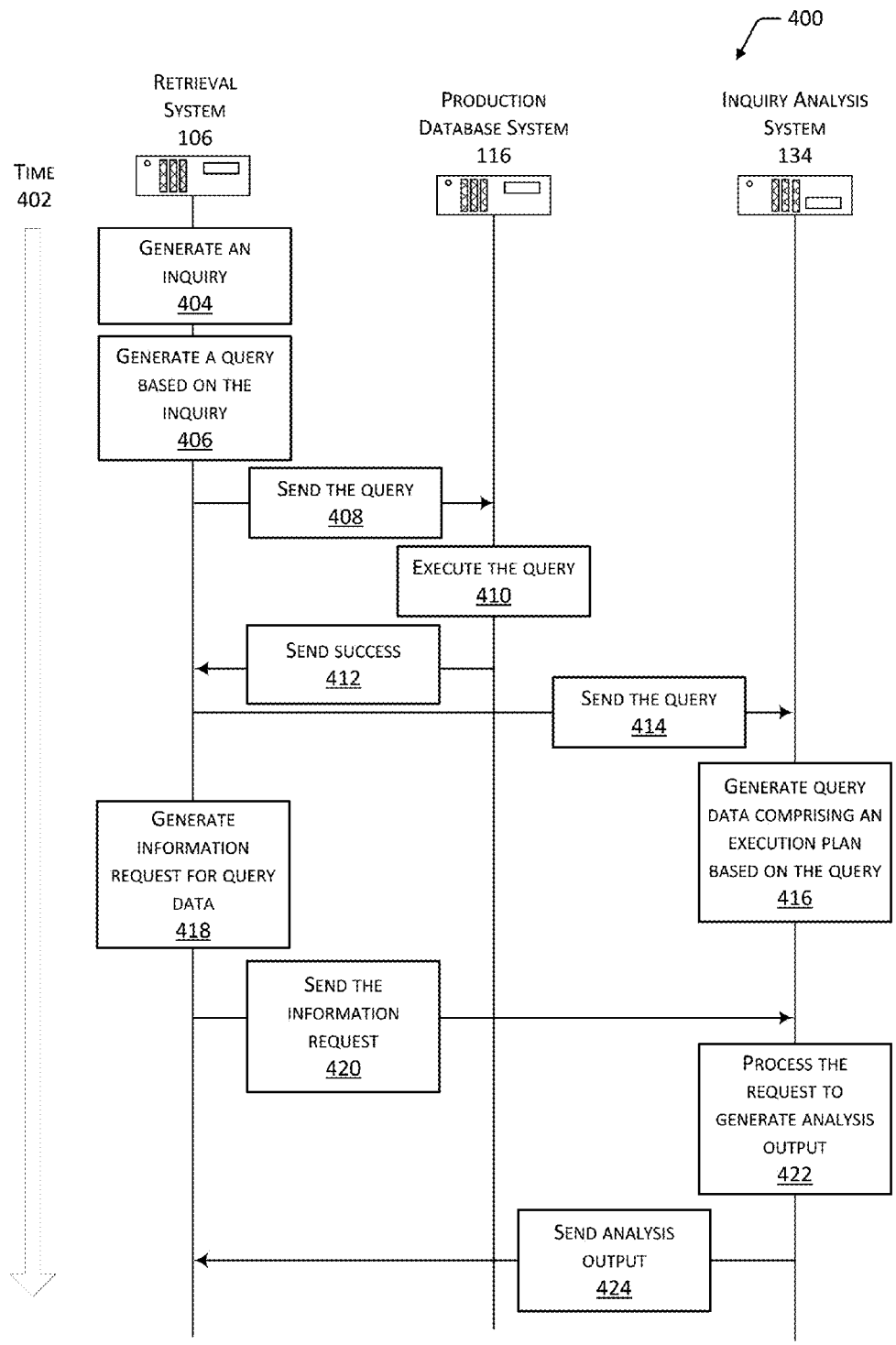
FIG. 4 illustrates a flow of data between devices in which query data is generated from processing an inquiry, and an information request based on that query data is made.

FIG. 4 illustrates a flow diagram 400 of data between devices. In this illustration, time increases down the page, as indicated by arrow 402. At 404, the retrieval system 106 generates an inquiry 112. For example, the user 102 may have used a web browser executing on the user device 104 to access a user interface provided by the user interface module 108. Through this user interface, the user 102 may have generated the inquiry 112.

At 406, the retrieval system 106 generates the query 114 based on the inquiry 112. For example, the query generation module 110 may use the inquiry 112 to generate a query 114 which is formatted as a SQL expression. At 408, the query 114 is sent to the production database system 116. At 410, the production database system 116 executes the query 114. As a result of the execution, query results 130 may be generated. These query results 130 may be sent to the retrieval system 106 or another device.

At 412, the production database system 116 may send an indication that the query 114 successfully executed. This indication may be used to prevent unsuccessful or improper queries 114 from being passed along to the inquiry analysis system 134.

Based on the indication, at 414 the retrieval system 106 may send the query 114 to the inquiry analysis system 134. As described above, at 416 the inquiry analysis system 134 may generate the query data 140. For example, the query data 140 may comprise the inquiry 112, the query 114, the execution plan 128, and so forth.

In some implementations the sequence may be altered from that described above. For example, the query 114 may be initially sent to the inquiry analysis system 134. Execution on the production database system 116 may be deferred until the query 114 has been successfully executed on the inquiry analysis system 134 against the shadow database 136.

At 418, the retrieval system 106 generates the information request 132 for query data 140. For example, the user 102(2) may have used the user device 104(2) to enter in a request for a listing of the top five tables which have been queried in the past week.

At 420, the information request 132 is sent to the inquiry analysis system 134. At 422, the inquiry analysis system 134 processes the information request 132 and generates the analysis output 144. For example, the inquiry analysis module 142 may process the information request 132 and generate analysis output 144 comprising a listing of the top five tables, as requested by the user 102(2).

At 424, the inquiry analysis system 134 sends the analysis output 144 to the retrieval system 106. The retrieval system 106 may present the analysis output 144 to the user 102 by way of the user interface provided by the user interface module 108. In other implementations the analysis output 144 may be directed to another device, such as the user device 104.

Figure 5:
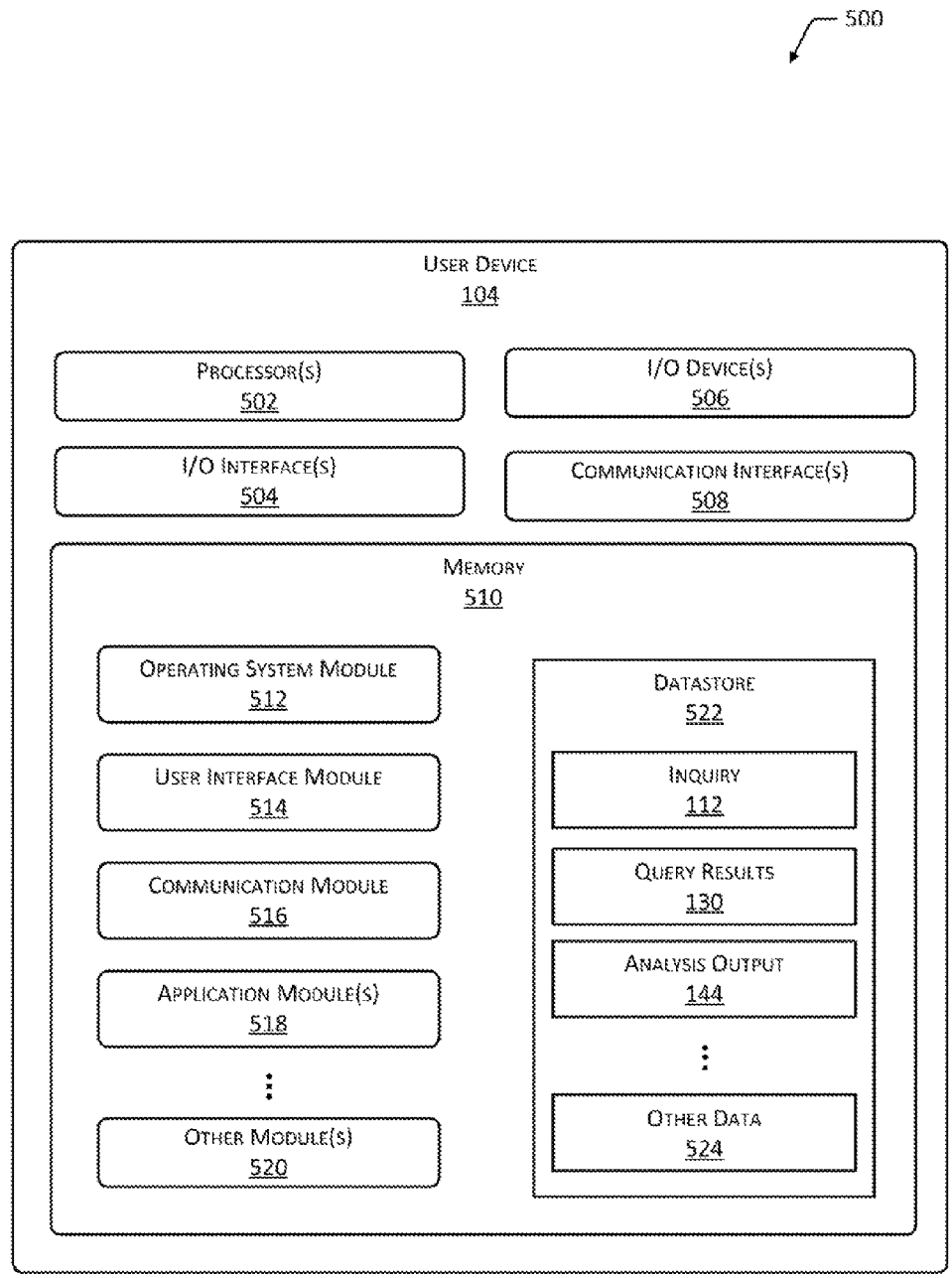
FIG. 5 illustrates a block diagram of the user device configured to participate in generating the inquiries, the information requests, or both.

FIG. 5 illustrates a block diagram 500 of the user device 104 configured to participate in one or more of generating the inquiries 112, the information requests 132, presenting the analysis output 144, and so forth. The user device 104 may include one or more processors 502 configured to execute one or more stored instructions. The processors 502 may comprise one or more cores. The user device 104 may include one or more input/output ("I/O") interface(s) 504 to allow the processor 502 or other portions of the user device 104 to communicate with other devices. The I/O interfaces 504 may comprise inter-integrated circuit ("I2C"), serial peripheral interface bus ("SPI"), Universal Serial Bus ("USB") as promulgated by the USB Implementers Forum, RS-232, one or more device interfaces such as High Definition Multimedia Interface ("HDMI") as promulgated by HDMI Licensing LLC, and so forth.

The I/O interface(s) 504 may couple to one or more I/O devices 506. The I/O devices 506 may include input devices such as one or more of a camera, a microphone, a touch sensor, a button, and so forth. The I/O devices 506 may also include output devices such as one or more of a display, audio speakers, haptic output devices, and so forth. The display may comprise an electrophoretic display, projector, liquid crystal display, interferometric display, light emitting diode display, and so forth. In some embodiments, the I/O devices 506 may be physically incorporated with the user device 104 or may be externally placed.

The user device 104 may also include one or more communication interfaces 508. The communication interfaces 508 are configured to provide communications with the user device 104, the retrieval system 106, the production database system 116, the inquiry analysis system 134, routers, access points, other servers, and so forth. The communication interfaces 508 may include devices configured to couple to one or more networks including PANs, LANs, WLANs, WANs, WWANs, and so forth.

The user device 104 may also include one or more busses or other internal communications hardware or software that allow for the transfer of data between the various modules and components of the user device 104.

As shown in FIG. 5, the user device 104 includes one or more memories 510. The memory 510 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 510 provides storage of computer readable instructions, data structures, program modules and other data for the operation of the user device 104.

The memory 510 may include at least one operating system ("OS") module 512. The OS module 512 is configured to manage hardware resource devices such as the I/O interfaces 504, the I/O devices 506, the communication interfaces 508, and provide various services to applications or modules executing on the processors 502. Also stored in the memory 510 may be one or more of the following modules. These modules may be executed as foreground applications, background tasks, daemons, and so forth.

A user interface module 514 is configured to provide one or more user interface elements to the user with the I/O devices 506 and to accept inputs received from the I/O devices 506. The user interface may include one or more visual, audible, or haptic elements. For example, the user interface may be configured to provide a graphic user interface, an audible user interface, and so forth. The user interface may be configured to present information using the I/O devices 506.

A communication module 516 is configured to support communication between the user devices 104 and other devices. In some implementations the communication module 516 may support encrypted communications. For example, hypertext transport protocol secured ("HTTPS") or transport layer security ("TLS") may be supported.

One or more application modules 518 may also be stored in the memory 510. For example, the application modules 518 may include a web browser, a front-end application configured to interface with the retrieval system 106, and so forth. Other modules 520 may also be present. For example, a user authentication module may be configured to authenticate the user 102 accessing the user device 104.

The memory 510 may also include a datastore 522 to store information. The datastore 522 may use a flat file, database, linked list, tree, executable code, or other data structure to store the information. In some implementations, the datastore 522 or a portion of the datastore 522 may be distributed across one or more other devices including servers, network attached storage devices, and so forth.

As depicted here, the datastore 522 may store the inquiry 112, query results 130, analysis output 144, and so forth. Other data 524 may also be stored. For example, the other data 524 may include user preferences, configuration files, and so forth.

Figure 6:
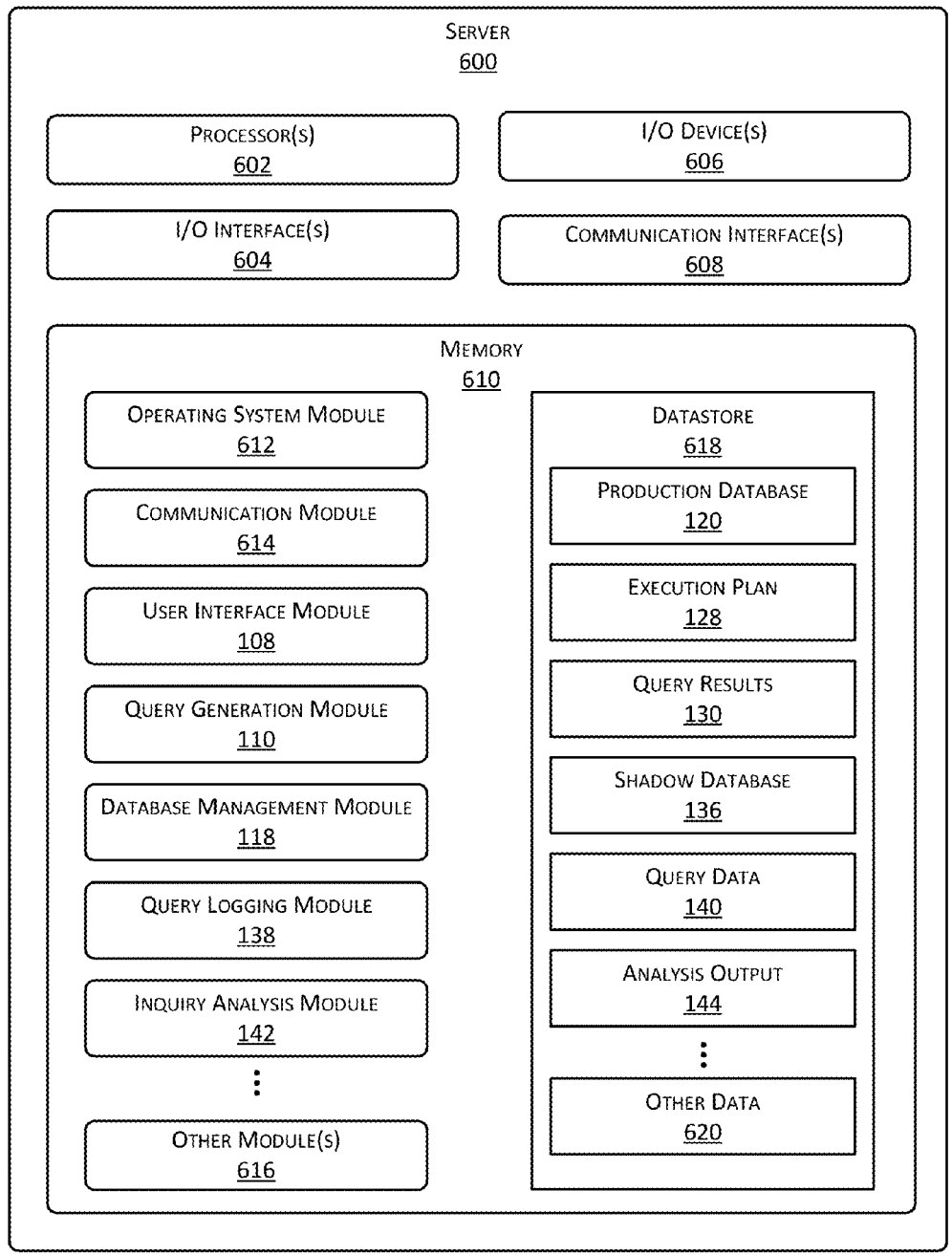
FIG. 6 illustrates a block diagram of a server configured to provide one or more of a retrieval system, production database system, or inquiry analysis system.

FIG. 6 illustrates a block diagram 600 of a server 600. One or more servers 600 may be configured to support operation of one or more of the retrieval system 106, the production database system 116, the inquiry analysis system 134, and so forth.

The server 600 may include one or more processors 602 configured to execute one or more stored instructions. The processors 602 may comprise one or more cores. The server 600 may include one or more I/O interface(s) 604 to allow the processor 602 or other portions of the server 600 to communicate with other devices. The I/O interfaces 604 may comprise I2C, SPI, USB, RS-232, and so forth.

The I/O interface(s) 604 may couple to one or more I/O devices 606. The I/O devices 606 may include input devices such as one or more of a keyboard, mouse, and so forth. The I/O devices 606 may also include output devices such as indicator lights, a display for use by administrative or maintenance personnel, a printer, and so forth. In some embodiments, the I/O devices 606 may be physically incorporated with the server 600 or may be externally placed.

The server 600 may also include one or more communication interfaces 608. The communication interfaces 608 are configured to provide communications with the user device 104, the web server, routers, access points, other servers, and so forth. The communication interfaces 608 may include devices configured to couple to one or more networks including PANs, LANs, WLANs, WANs, WWANs, and so forth.

The server 600 may also include one or more busses or other internal communications hardware or software that allow for the transfer of data between the various modules and components of the server 600.

As shown in FIG. 6, the server 600 includes one or more memories 610. The memory 610 comprises one or more CRSM. The memory 610 provides storage of computer readable instructions, data structures, program modules and other data for the operation of the server 600.

The memory 610 may include at least one OS module 612. The OS module 612 is configured to manage hardware resource devices such as the I/O interfaces 604, the I/O devices 606, the communication interfaces 608, and provide various services to applications or modules executing on the processors 602. Also stored in the memory 610 may be one or more of the following modules. These modules may be executed as foreground applications, background tasks, daemons, and so forth.

A communication module 614 is configured to support communication with other devices using the network. In some implementations the communication module 614 may support encrypted communications. For example, HTTPS or TLS may be supported.

As described above, the user interface module 108 may be configured to provide one or more application programming interfaces, web interfaces, and so forth. The user interface module 108 may be configured to accept inputs and send outputs using the I/O interfaces 604, the communication interfaces 608, or both.

The query generation module 110 may be stored in the memory 610. The query generation module 110 may be configured to generate one or more queries 114 based on one or more inquiries 112. For example, the query generation module 110 may transform a natural language input into a SQL statement.

The database management module 118 processes the query 114 against the database to which it is coupled. For example, the database management module 118 may execute the query 114 to perform one or more operations on the tables 122 or other data structures, the data 124 therein, the metadata 126, and so forth. In some implementations, the database management module 118 may be configured to generate the execution plan 128 for a query 114. The database management module 118 may be coupled to one or more databases. For example, the database management module 118(1) executing on the server 600 which is configured to support the production database system 116 may be coupled to the production database 120.

As described above, the query logging module 138 is configured to generate query data 140 based on queries 114 provided for processing. The query logging module 138 may also perform other actions, such as configuring the database management module 118, the queries 114 to be processed, or both, to generate the execution plan 128.

The inquiry analysis module 142 may also be stored in the memory 610. The inquiry analysis module 142 is configured to process the information request 132 and generate analysis output 144 based on the query data 140.

Other modules 616 may also be present. In one implementation, an authentication module may be configured to authenticate the user 102 or device accessing the server 600. For example, the authentication module may verify that the user 102 has proper permissions to generate the inquiry 112 or the information request 132.

The memory 610 may also include a datastore 618 to store information. The datastore 618 may use a flat file, database, linked list, tree, executable code, or other data structure to store the information. In some implementations, the datastore 618 or a portion of the datastore 618 may be distributed across one or more other devices including servers, network attached storage devices, and so forth.

As depicted here, the datastore 618 may store the production database 120, the execution plan 128, the query results 130, the shadow database 136, the query data 140, the analysis output 144, and so forth. Other data 620 may also be stored. For example, the other data 620 may include configuration settings, access permissions, and so forth.

While the server 600 is described above in terms of a single device, one or more devices, such as a server cluster, virtual server, and so forth, may provide the same or similar functionality. For example, the retrieval system 106, the production database system 116, the inquiry analysis system 134, and so forth may be executed on virtual servers in a distributed computing environment, accessing data such as the production database 120 and or the shadow database 136 which are stored in distributed storage servers.

Illustrative Processes

Figure 7:
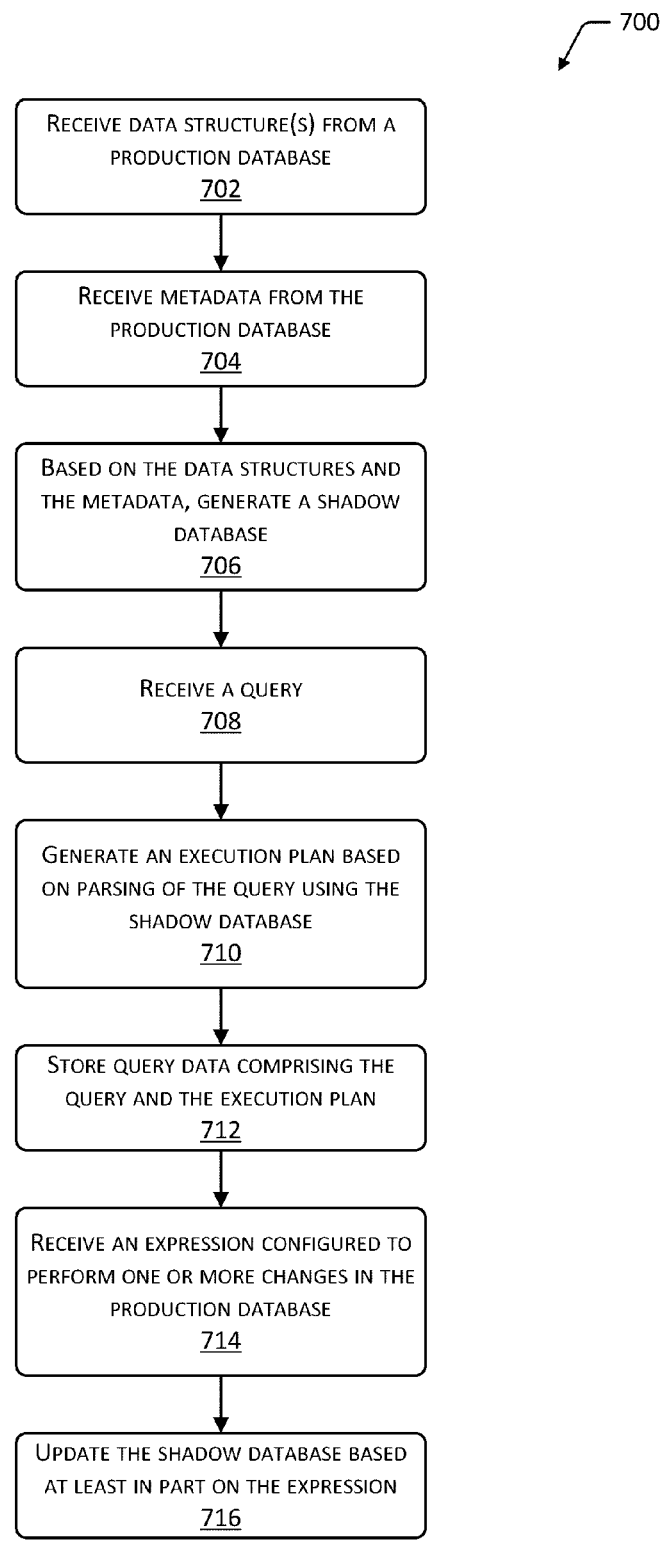
FIG. 7 is a flow diagram of a process of generating query data.

FIG. 7 is a flow diagram 700 of a process of generating the query data 140. One or more of the retrieval system 106, the production database system 116, the inquiry analysis system 134, or another device may implement this process.

Block 702 receives a first set of data structures, such as table structure data from a first database. The table structure data may be indicative of one or more tables 122 in a relational database. For example, the first database may be the production database 120.

Block 704 receives metadata 126 associated with the first database. Continuing the example, the metadata 126 may be from the production database 120. As described above, the metadata 126 may include information indicative of one or more of: relationships between two or more tables 122, cost data associated query execution by the first database, metrics associated with access to the first database, and so forth.

Block 706 generates a second database based on the first set of data structures and the metadata 126. For example, the shadow database 136 may be generated using the table structure data and the metadata 126 from the production database. The second database may duplicate, at least in part, the first database.

In one implementation, the shadow database 136 may comprise the tables 122 and the metadata 126, but may be empty of data 124. In another implementation, the shadow database 136 may include a subset or sample of the data 124. For example, 1% of the total data 124 may be copied to the shadow database 136. Use of this subset may be used to provide sample output to the user 102 or device making the inquiry 112.

As a result of containing no or little data 124, the shadow database 136 may use significantly fewer resources compared to the production database 120. For example, the production database 120 may have petabytes of data 124 while the shadow database 136 has none or very little.

Block 708 receives the query 114. As described above, the query 114 may comprise expressions in a data manipulation language, such as a SQL statement. The query 114 may be received from the user device 104, the retrieval system 106, or from another device, system, or process.

In some implementations the query 114 may include, or be associated with, information indicative of an account, such as a user or device account. For example, a user account identifier of the user 102 accessing the user device 104 may be included in the query 114.

Block 710 generates the execution plan 128 based on parsing the query 114 using the second database. For example, the database management module 118(2) of the inquiry analysis system 134 may process the query 114 against the shadow database 136. As described above, the execution plan 128 comprises information indicative of execution of the query 114 against one or more tables 122 in the second database.

Block 712 stores the query data 140 which may comprise the query 114 and the execution plan 128. For example, the query data 140 may be maintained as another table 122 in the shadow database 136. In some implementations, the query data 140 may also comprises the information indicative of the account associated with the query 114.

Over time, the production database 120 may experience changes. For example, new columns may be added to the table 122(1), other columns removed, and so forth. Block 714 receives an expression configured to perform one or more changes on at least a portion of the production database 120. For example, the production database system 116 may forward an expression to add a new column to the table 122(1) to the inquiry analysis system 134. The expression may be expressed in a data definition language.

Block 716 updates the shadow database 136 based at least in part on the expression. For example, the new column may be added to the table 122(1). Once the updates are complete, the shadow database 136 once again duplicates the structure of the production database 120.

Figure 8:
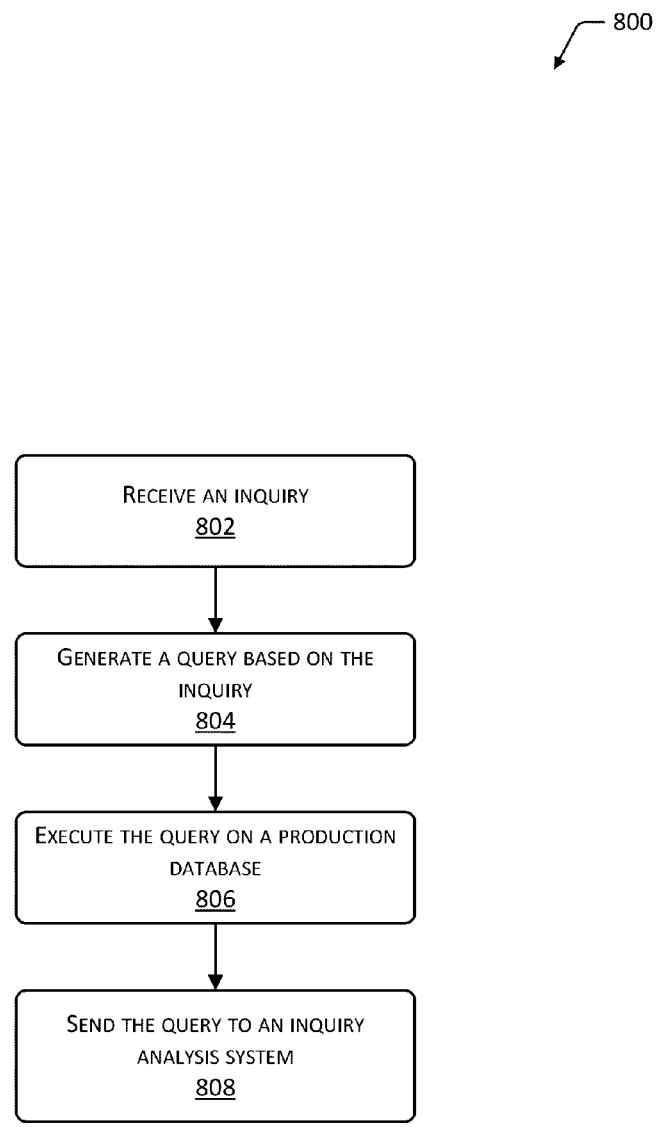
FIG. 8 is a flow diagram of a process of sending a query to the inquiry analysis system.

FIG. 8 is a flow diagram 800 of a process of receiving the inquiry 112 and sending the query 114 to the inquiry analysis system 134. One or more of the retrieval system 106, the production database system 116, the inquiry analysis system 134, or another device may implement this process.

Block 802 receives the inquiry 112. For example, the user interface module 108 of the retrieval system 106 may receive the inquiry 112 from the user device 104. As described above, in some implementations the user interface module 108 may be used to generate the inquiry 112.

Block 804 generates the query 114 based on the inquiry 112. For example, the query generation module 110 may accept a natural language inquiry 112 and generate the query 114 as a SQL expression.

Block 806 executes the query on the production database 120. For example, the database management module 118(1) may receive and process the query 114 against the production database 120. In some implementations, the database management module 118(1) may provide an acknowledgement or confirmation of successful execution of the query 114.

Block 808 sends the query 114 to the inquiry analysis system 134. In some implementations, other information such as the inquiry 112, identification information of the user 102, identification information of the user device 104, and so forth may also be sent.

The action of block 808 may be based on the receipt of the acknowledgement or confirmation of successful execution of the query 114. For example, queries 114 which successfully run would be passed to the inquiry analysis system 134, while queries 114 which fail would not.

In another implementation, all queries 114 may be passed to the inquiry analysis system 134. In this implementation, the inquiry analysis system 134 may be configured to store query data 140 about these failed queries 114, or discard that information.

Figure 9:
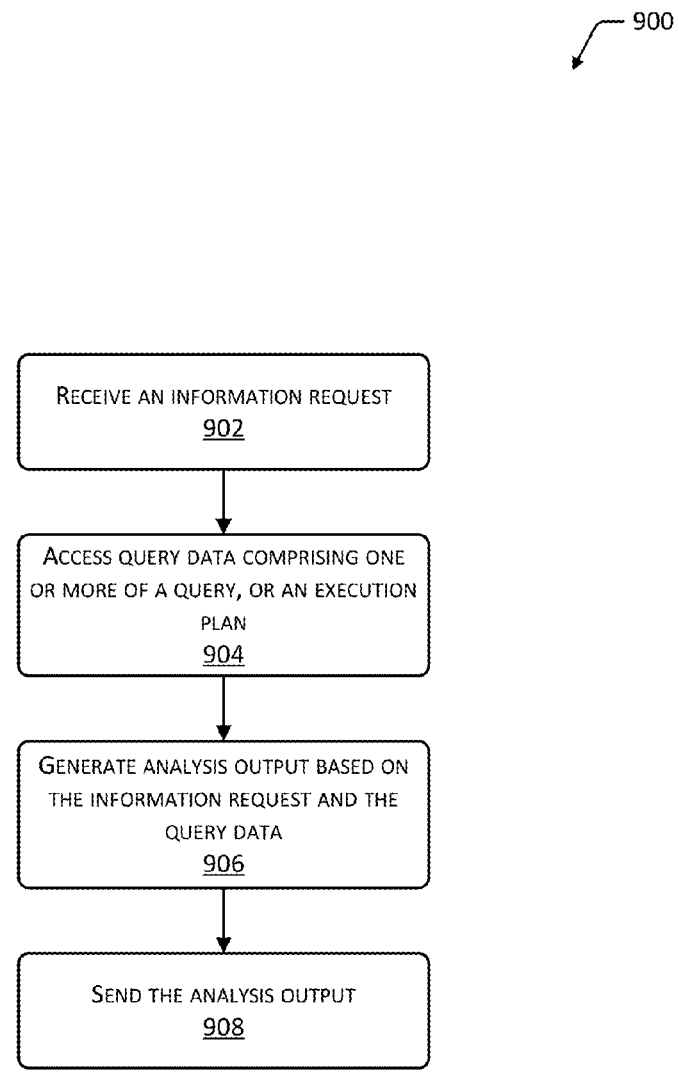
FIG. 9 is a flow diagram of a process of generating analysis output using query data.

FIG. 9 is a flow diagram of a process of generating analysis output using query data. One or more of the retrieval system 106, the production database system 116, the inquiry analysis system 134, or another device may implement this process.

Block 902 receives the information request 132. For example, the inquiry analysis system 134 may receive the information request 132 from the retrieval system 106.

Block 904 accesses the query data 140. As described above, the query data 140 may include one or more of the inquiry 112, the query 114, the execution plan 128, and so forth.

Block 906 generates the analysis output 144. The analysis output 144 may be based on the information request 132 and the stored query data 140. The analysis output 144 may include a variety of information including but not limited to the following: Information about one or more date ranges used against one of the one or more tables. For example, the queries 114 in the query data 140 are searching for data which within a seven-day date range. Information about one or more filter conditions used against the one or more tables 122 may be provided. For example, details about the filter predicates 208 used. The analysis output 144 may include information about one or more join keys used between a plurality of the one or more tables 122. Information about frequency of use of one or more columns in the one or more tables 122 may be provided. For example, a histogram indicating how often the columns are accessed may be included in the analysis output 144. The analysis output 144 may also be used to identify common join conditions, validate queries 114 are using recommended join conditions, and so forth.

In one implementation the analysis may provide a notification or alarm. One or more threshold parameters may be accessed. Based on a comparison between the analysis output 144 and the one or more threshold parameters, one or more notifications may be generated and sent. For example, a threshold parameter may include access to a restricted table 122. The analysis output 144 may indicate that an inquiry 112 has been made which includes the restricted table 122. A notification may be generated and provided to a system administrator, indicating access to the restricted table 122.

The analysis output 144 may also be based at least in part on different tables 122, metadata 126, and so forth. For example, the shadow database 136 may maintain different versions of metadata 126. These different versions of metadata 126, tables 122, or both may be historical, such as the metadata 126 from the past year, or may be generated such as to test a particular operational scenario.

The inquiry analysis system 134 may be configured to receive first metadata 126(1) metadata associated with the production database 120. The shadow database 136 duplicates as second metadata 126(2), at least in part, the first metadata 126(1) associated with the production database 120. For example, most but not all of the metadata 126(1) may be copied. The query 114 may be executed based at least in part on the first metadata 126(1) producing a first execution plan 128(1) and again using the second metadata 126(2) producing a second execution plan 128(2). The query data 140 from processing both the first metadata 126(1) and the second metadata 126(2) may then be stored. The results from executing the same query 114 against the potentially different metadata 126 may provide additional information to administrators about how changes in the metadata 126 affect operation of the database management module 118.

Block 908 sends the analysis output 144. For example, the inquiry analysis system 134 may send the analysis output 144 to the retrieval system 106 using the network. The user 102 may access the analysis output 144 using the user device 104. With access to the analysis output 144, the user may be able to make better decisions about how to manage, operate, or maintain the databases.

Those having ordinary skill in the art will readily recognize that certain steps or operations illustrated in the figures above can be eliminated or taken in an alternate order. Moreover, the methods described above may be implemented as one or more software programs for a computer system and are encoded in a computer readable storage medium as instructions executable on one or more processors.

The computer readable storage medium can be any one of an electronic storage medium, a magnetic storage medium, an optical storage medium, a quantum storage medium and so forth. Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments and situations.

Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A system comprising:
 a communication interface;
 a memory storing computer-executable instructions; and
 a processor configured to couple to the communication interface, access the memory, and execute the computer-executable instructions to:
  receive a first set of information about at least one data structure from a first database, wherein the at least one data structure is indicative of one or more tables in a relational database;
  receive metadata associated with the first database;
  based at least in part on the first set of information about the at least one data structure from a first database and the metadata, generate a second database comprising a shadow database having the at least one data structure of the first database and the metadata associated with the first database duplicated in the second database with data from the first database omitted;
  receive a query, wherein the query comprises expressions in a data manipulation language;
  generate an execution plan based on parsing the query to execute the query against the second database, wherein the execution plan comprises information indicative of execution of the query against the second database having the at least one data structure of the first database and the metadata associated with the first database duplicated in the second database with data from the first database omitted from the second database;
  store query data comprising the query and the execution plan;
  receive an information request;
  access the query data; and
  generate analysis output based on the information request and the query data.

2. The system of claim 1, wherein the metadata comprises information indicative of one or more of:
 relationships between two or more tables,
 cost data associated query execution by the first database,
 metrics associated with access to the first database.

3. The system of claim 2, wherein the two or more tables in the second database are empty of data.

4. A method comprising:
 receiving a query;
 accessing a first database having a first set of data structures, wherein the first database duplicates at least in part a second set of data structures of a second database based on a first set of information about the second set of data structures and first metadata associated with the second database, and the first database omits data stored in the second database;
 executing the query against the first database;
 based on the execution of the query, generating an execution plan based on parsing the query to execute the query against the first database, wherein the execution plan comprises information indicative of execution of the query against the first database having the at least one data structure of the second database and the metadata associated with the second database duplicated in the first database with data from the second database omitted from the first database;
 storing query data comprising the query and the execution plan;
 receiving an information request;
 accessing the query data; and
 generating analysis output based on the information request and the query data.

5. The method of claim 4, the execution plan comprising information indicative of a sequence of operations performed during execution of the query against the first database.

6. The method of claim 4, further comprising:
 receiving information indicative of an account associated with the query, and
 wherein the query data further comprises the information indicative of the account.

7. The method of claim 4, the second set of data structures comprising a plurality of relational tables without data.

8. The method of claim 7, wherein the query comprises one or more expressions phrased in a structured query language ("SQL") statement.

9. The method of claim 7, further comprising:
receiving a data definition language expression, wherein the expression is configured to perform one or more changes on at least a portion of the second set of data structures; and
updating the first set of data structures based at least in part on the expression.

10. The method of claim 4, further comprising:
receiving an information request;
generating analysis output based on the information request and the stored query data; and
sending the analysis output.

11. The method of claim 4, further comprising:
accessing one or more threshold parameters;
generating analysis output based on the stored query data;
generating one or more notifications based on the analysis output and the one or more threshold parameters; and
sending the one or more notifications.

12. The method of claim 4, further comprising:
generating analysis output based on the stored query data, wherein the analysis output is indicative of one or more date ranges stored in the query data.

13. The method of claim 4, further comprising:
receiving second metadata associated with the second database;
wherein the first database duplicates as the first metadata at least in part the second metadata associated with the second database;
wherein the executing of the query is based at least in part on the first metadata; and
wherein the query data comprises information based on the first metadata.

14. The method of claim 13, further comprising:
wherein the first metadata comprises a first set of metadata and a second set of metadata;
wherein the executing the query against the first database occurs using the first set of metadata;
executing a second query based on the query and the second set of metadata;
based on the execution of the second query, generating a second execution plan;
storing query data comprising the query and the second execution plan; and
generating analysis output based on the stored query data.

15. A computer-implemented method comprising:
receiving a first set of information about at least one data structure from a first database, wherein the first set of data structures is indicative of one or more tables configured as a relational database;
receiving metadata associated with the first database;
generating a second database comprising a shadow database having the at least one data structure of the first database and the metadata associated with the first database duplicated in the second database with data from the first database omitted from the second database based at least in part on the first set of information about at least one data structure and the metadata;
receiving a query, wherein the query comprises a structured query language statement;
generating an execution plan based on executing the query using the second database, wherein the execution plan comprises information indicative of execution of the query against the second database having the at least one data structure of the first database and the metadata associated with the first database duplicated in the second database with data from the first database omitted from the second database;
storing query data comprising the query and the execution plan;
receiving an information request;
accessing the query data; and
generating analysis output based on the information request and the query data.

16. The computer-implemented method of claim 15, further comprising:
receiving a subset of data stored in one or more tables of the first database; and
storing the subset of data in one or more tables of the second database.

17. The computer-implemented method of claim 15, further comprising:
receiving a data definition language expression; and
updating the second database based at least in part on the data definition language expression.

18. The computer-implemented method of claim 15, further comprising:
generating analysis output based on the query data, wherein the analysis output comprises one or more of:
one or more date ranges used against one or more tables,
one or more filter conditions used against the one or more tables,
one or more join keys used between a plurality of the one or more tables, or
frequency of use of one or more columns in the one or more tables.

19. The computer-implemented method of claim 15, further comprising:
generating analysis output based on the query data, wherein the generating comprises:
validating the query uses one or more of a predetermined join or a predetermined filter.

20. The computer-implemented method of claim 15, further comprising:
modifying the first metadata to generate second metadata; and
generating a second execution plan based on executing the query using the second database and the second metadata.

* * * * *